United States Patent [19]
Leicht

[11] Patent Number: 5,893,709
[45] Date of Patent: Apr. 13, 1999

[54] HEAT-TRANSFER DEVICE FOR USE IN A CONVECTIVE-HEAT INSTALLATION, IN PARTICULAR IN A CONVECTIVE SOLDERING INSTALLATION

[76] Inventor: Helmut Walter Leicht, Messerschmittring 61, D-86343 Königsbrunn bei Augsburg, Germany

[21] Appl. No.: 08/663,053
[22] PCT Filed: Dec. 14, 1994
[86] PCT No.: PCT/EP94/04143
§ 371 Date: Aug. 26, 1996
§ 102(e) Date: Aug. 26, 1996
[87] PCT Pub. No.: WO95/16537
PCT Pub. Date: Jun. 22, 1995

[30] Foreign Application Priority Data

Dec. 14, 1993 [DE] Germany ............ 43 42 634

[51] Int. Cl.$^6$ .................. F26B 21/06; F27B 9/02
[52] U.S. Cl. .................. 432/152; 34/78
[58] Field of Search .......... 432/54, 59, 152, 432/147, 175; 34/78; 165/169

[56] References Cited

U.S. PATENT DOCUMENTS

| | | | |
|---|---|---|---|
| 3,837,794 | 9/1974 | Phillips | 432/143 |
| 4,315,042 | 2/1982 | Spigarelli | 427/96 |
| 4,389,797 | 6/1983 | Spigarelli et al. | 34/78 |
| 4,628,616 | 12/1986 | Shirai et al. | 34/78 |
| 4,759,710 | 7/1988 | Polaczy et al. | 34/78 |
| 4,790,749 | 12/1988 | Mauro | 432/59 |
| 4,957,432 | 9/1990 | Rachal et al. | 432/59 |
| 5,038,496 | 8/1991 | Mishina et al. | 34/78 |
| 5,074,782 | 12/1991 | Hoetzl et al. | 432/152 |
| 5,163,599 | 11/1992 | Mishina et al. | 228/42 |
| 5,180,096 | 1/1993 | Kondo | 228/180 |
| 5,328,084 | 7/1994 | Halstead et al. | 432/128 |

FOREIGN PATENT DOCUMENTS

| | | | |
|---|---|---|---|
| 2690736 | 11/1993 | France | F27B 9/36 |
| 2442180 | 3/1975 | Germany | B23K 1/02 |
| 8913226 U | 2/1990 | Germany | B23K 1/015 |
| WO8203681 | 10/1982 | WIPO | F27B 9/06 |

OTHER PUBLICATIONS

English language Abstract of JP 63-0121232.
English language Abstract of JP 1-200537.
Patent Abstracts of Japan, Section M, vol. 13, No. 28 re: JP 63-242469.

*Primary Examiner*—Teresa Walberg
*Assistant Examiner*—Gregory A. Wilson
*Attorney, Agent, or Firm*—George W. Rauchfuss, Jr.

[57] ABSTRACT

The present invention provides a heat-transfer device for use in a convective-heat installation, in particular in a convective soldering installation. A hollow body contains a heated fluid transferring heat via the wall of the hollow body to the soldering item. The advantages of the present invention reside in the fact that the maximum furnace temperature can be exactly adjusted, the dissipated heat is compensated for extremely quickly, the soldering items are treated carefully and the temperature of the system soldering item/soldering installation does not overshoot.

13 Claims, 1 Drawing Sheet

HEAT-TRANSFER DEVICE FOR USE IN A CONVECTIVE-HEAT INSTALLATION, IN PARTICULAR IN A CONVECTIVE SOLDERING INSTALLATION

FIELD OF THE INVENTION

The present invention relates to a heat-transfer device for use in a convective-heat installation, in particular in a convective soldering installation.

BACKGROUND OF THE INVENTION

Convective soldering installations are used for reflow soldering. The problem occurring in this connection is that it is difficult to stabilise the system "soldering item/soldering installation" on account of the relatively poor heat transfer. In particular when working soldering items having a relatively large mass, the control of the system is so slow that only low throughput velocities can be achieved.

The heat-transfer devices presently in use in convective soldering installations (forced-air or convective furnaces) transmit heat by means of forced gases, as a rule with air. They have in general several temperature zones. Since this heat transfer from the furnace to the soldering item is achieved relatively slowly (small $\alpha$), the installations are mostly quite long and the electrical power of the systems is high. Electrical power values of 90 kW and more occur quite often.

In order to accelerate the heat transfer, combined systems are available in which gas convection is used in addition to a direct infrared-radiation heating. The gas convection is to level out the drawbacks of the pure infrared radiation, such as shading effects etc., so that the workpiece is prevented from partially overheating.

The problem with most of the workpieces, which constitute the soldering items, is that they have to be heated rapidly as well as reliably while an overheating of individual parts must be excluded. The demand for rapid heating leads to a high temperature difference ($\Delta T$) between the heat source and the soldering items. In order to exclude an overheating of the peripheral area or, e.g., of protruding components of a componentry, it would be desirable to keep $\Delta T$ between the heat-supplying gas and the desired maximum temperature at the workpiece as low as possible.

The only possibility to solve this contradiction is to select $\Delta T$ such that it is as low as possible and to let the heat-transfer gas pass the workpiece as quickly as possible.

The main problem of the convective systems available today is that it is difficult to control temperature fluctuations in the system. In particular if large masses on a low temperature level are transported into the furnace, heat is withdrawn from the interior space. This heat loss has to be compensated for as quickly as possible. At the same time, the control must not overshoot too much so that the maximum system temperature is not exceeded.

In contrast, it is the object underlying the present invention to provide a heat-transfer device, in particular in a convective soldering installation or in a drying installation, which has a uniform thermal behaviour and controls the thermal equilibrium as quickly as possible.

This object is achieved by the features of claims.

SUMMARY OF THE INVENTION

For solving this problem, the invention is based on the idea of arranging at least one hollow body containing a heated fluid in the vicinity of the workpiece, e.g. the soldering item; the fluid transmits heat via the wall of the hollow body to the workpiece. The fluid can be vapour or a liquid such that a very precise temperature adjustment is guaranteed and the heat capacity is high. The heated fluid is occluded and separated from the workpiece to be heated.

The advantage of the present invention resides in the fact that it is possible to restrict the maximum furnace temperature exactly and in a simple way and that at the same time the dissipated heat is compensated for extremely quickly and the system cannot overshoot. Moreover, the occluded fluid does not get lost so that environmental damage can be prevented.

BRIEF SUMMARY OF THE DRAWINGS

In the following, the invention will be illustrated by means of the drawings, in which.

DETAILED DESCRIPTION OF THE INVENTION

Figure 1A:
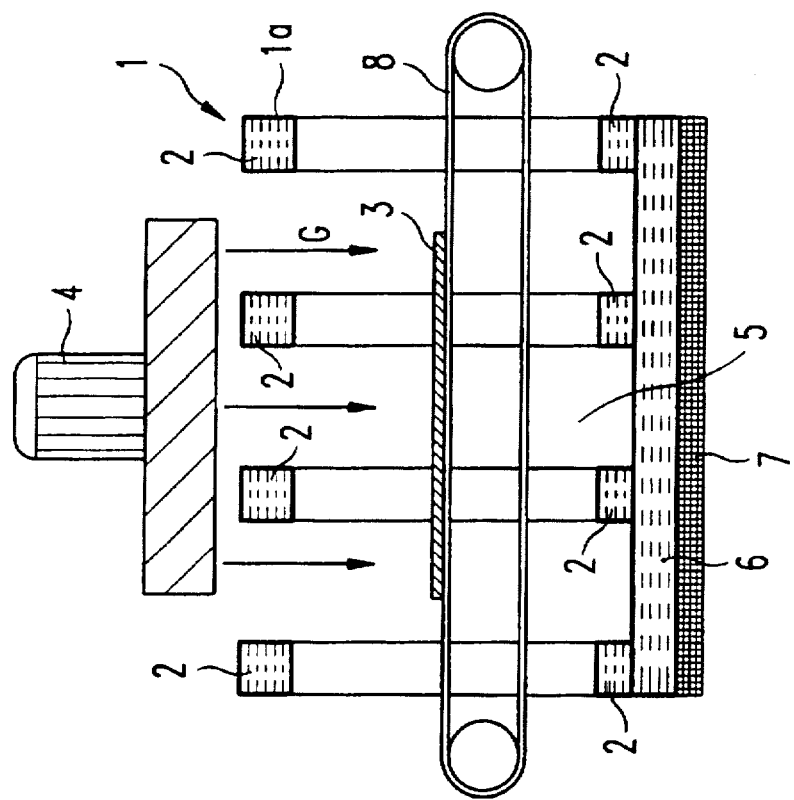
FIG. 1a shows a schematic view of an embodiment according to the invention.

FIG. 1a shows a preferred embodiment of the heat-transfer device according to the invention in combination with the work table in a soldering installation. A hollow body 1 consisting of several tubes 2 surrounds a transport channel 5 in which a conveyor belt 8 carries a workpiece (soldering item) 3. The hollow body 1 is filled with hot vapour which is produced in a liquid bath 6 below the tubes 2 of the hollow body 1 by a heating installation 7. By means of a fan 4, a gas G, such as air or nitrogen as an inert gas, is blown against the wall 1a of the hollow body 1, the heat exchange taking place between the wall 1a and the gas G. This heat is transferred to the soldering item 3 and there initiates the soldering step. The heat dissipated from the surface of the hollow body 1 is immediately compensated for by means of the extremely good heat transfer of the vapour condensing at the inside of the tube. Thus, the more heat is dissipated at the surface, the more vapour is condensed and supplies heat in order to balance the system. If the transport channel is heated to the working temperature, the temperature equilibrium becomes stable. The amount of the vapour produced in the heating system must therefore only compensate for the heat losses of the system. This requires a lower vapour amount than the heating of the system. Due to a sufficient heating capacity, the system has an additional vapour potential which is required to compensate for system losses which occur for example when heating workpieces 3 are being introduced. If a workpiece 3 is transported into the furnace by means of the conveyor belt 8, heat is withdrawn from the system, and by means of the gas flow G the same process is initiated as for heating the transport channel at the beginning until there is a heat equilibrium in the system. Preferably, the liquid used for the liquid bath 6 is the same as that which is used for vapour phase soldering. The system liquid bath-hollow body is preferably an open system. Thus, the pressure in the hollow body is not considerably increased and the temperature of the vapour cannot exceed the boiling point of the liquid. Consequently, the maximum limiting temperature of the system can be accurately determined and can for example be 215 or 290° C.

According to the invention, however, the system can also be closed; in this case, the pressure and thus the boiling point can be maintained at a desired value by a suitable adjustment of the heating capacity and/or the energy losses in order to keep the heat transfer at a certain temperature.

Figure 1B:
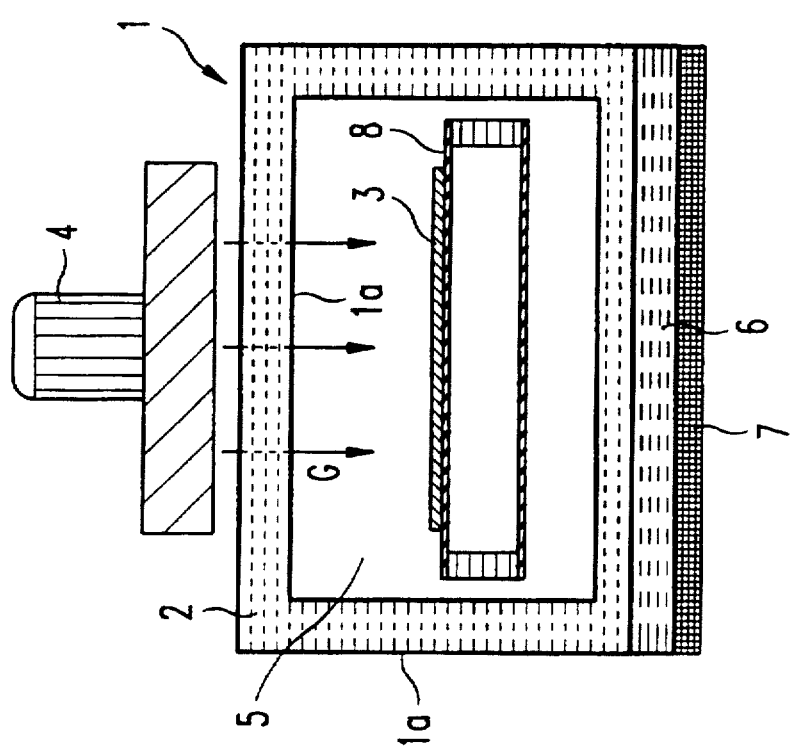
FIG. 1b shows a cross-section through the embodiment of the invention according to FIG. 1a, which is perpendicular to its surface plane.

FIG. 1b shows a cross-section in the direction of the conveyor belt 8. The spaces between the tubes 2 of the hollow body 1 guarantee the heat transfer via the gas G to the soldering item 3.

The embodiment of the invention according to FIGS. 1a and 1b has i.a. the following advantages:

1. The maximum temperature of the system is defined by the working temperature of the fluid and thus the maximum temperature of the transport channel is also determined;
2. If heat is dissipated from the tube surface, this heat loss is immediately compensated for without the use of any control elements;
3. The velocity of the heat transfer is essentially determined by the air throughput and the air-flow velocity;
4. The load capacities of such a system considerably exceed the capacity values of the systems presently available;
5. The costs can remain considerably under those for comparable systems available so far.

Instead of vapour, the hollow body 1 can also be filled with a liquid which is, e.g., heated by an external heating system. This liquid is heated in a heating unit to a certain temperature level and transported into the hollow body and circulated therein. Thus, a high thermal capacity is available. The system temperature is controlled in the heating unit. This embodiment is advantageous in that the maximum temperature of the hollow body can be varied via the temperature adjustment. However, the temperature has to be controlled and monitored. Moreover, a unit for circulating the liquid is necessary.

The heat transfer from the hollow body to the soldering item can also be achieved exclusively by heat radiation, and a combination of radiation and convection is possible as well; if necessary, additional radiant heaters can be used.

The device according to the invention can preferably be used for heating electronic componentries during reflow soldering. A further application consists in the repair soldering of components which are to be unsoldered or resoldered.

The heat-transfer device according to the invention can be also used, e.g. when reduced in size, for selectively heating a componentry. The installation is then designed such that the device is in the direct vicinity of the component to be heated. An air flow which is passed through the system is heated to the maximum temperature defined by the fluid. It flows around the component to be unsoldered and transfers its heat to the component and the printed circuit board. Since the temperature is limited by the boiling point of the working fluid, any damage to the component or the printed circuit board can be excluded.

In order to avoid heat losses, the installation depicted in the drawing is preferably provided in a closed housing which is not shown and has openings and transfer canals for supplying and transporting off the workpiece to be heated.

I claim:

1. A heat-transfer device for heating a workpiece (3) by means of convective heat transfer, said heat transfer device comprising a plurality of tubes (2) surrounding a transport channel (5) for the workpiece (3), in which said workpiece is carried through, said plurality of tubes containing a heated vapour, the vapour transferring heat to inner surfaces of walls (1a) of the tubes (2), said heat being exchanged between the walls (1a) of the tubes and gas (G) provided in the transport channel (5) and by convection to the workpiece (3) to be heated as the workpiece (3) travels through said plurality of tubes (2).

2. The device according to claim 1, characterised in that the heat is transferred from the tubes (2) to the workpiece (3) by heat radiation.

3. The device according to claim 1, characterised in that the heat is transferred from the tubes (2) to the workpiece (3) by convection.

4. The device according to claim 1, characterised in that the heat is transferred from the tubes (2) to the workpiece (3) by a combination of heat radiation and convection.

5. The device according to claim 3 further comprising a fan (4), and a gas (G) for flowing around the wall (1a) of the tubes (2) and taking up and transporting heat to the workpiece (3).

6. The device according to claim 5, characterised in that the gas is air.

7. The device according to claim 5, characterised in that an oxygen-free gas, preferably nitrogen is used as the gas.

8. The device according to claim 1, characterised in that the vapour is produced from a liquid used in vapour phase soldering.

9. The device according to claim 1, characterized in that below the tubes (2) a liquid bath (6) and a heating unit (7) are arranged, and the liquid is vaporised and the vapour produced fills the tubes (2).

10. The device according to claim 9, characterised in that the tubes (2) and the liquid bath (6) form an open or closed system so that the temperature of the vapour does not exceed that of the boiling point of the liquid.

11. The device according to claim 1, wherein the convective-heat installation is a convective-soldering installation.

12. In a method for heating electronic components during a reflow soldering operation of said components, the improvement comprising heating the electronic components with the heat transfer device of claim 1.

13. In a method for heating soldered components for repair soldering of the components, the improvement comprising heating the soldered components with a heat transfer device of claim 1.

* * * * *